(12) United States Patent
Veliche

(10) Patent No.: US 9,654,679 B1
(45) Date of Patent: May 16, 2017

(54) IMAGERY QUANTIFICATION OF DAMAGE

(71) Applicant: Liberty Mutual Insurance Company, Boston, MA (US)

(72) Inventor: Razvan Veliche, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 31 days.

(21) Appl. No.: 14/202,725

(22) Filed: Mar. 10, 2014

Related U.S. Application Data

(60) Provisional application No. 61/780,581, filed on Mar. 13, 2013.

(51) Int. Cl.
*H04N 5/232* (2006.01)

(52) U.S. Cl.
CPC ................................ *H04N 5/23203* (2013.01)

(58) Field of Classification Search
CPC .. H04N 5/23203; G06T 7/0075; G01C 11/10; G06Q 40/08
See application file for complete search history.

(56) References Cited

U.S. PATENT DOCUMENTS

| | | | |
|---|---|---|---|
| 2002/0013685 A1 | 1/2002 | Kidd | |
| 2002/0055861 A1 | 5/2002 | King | |
| 2002/0161533 A1 | 10/2002 | Uegaki | |
| 2007/0052973 A1 | 3/2007 | Yamaguchi | |
| 2007/0288135 A1 | 12/2007 | Kidd | |
| 2008/0267487 A1 | 10/2008 | Siri | |
| 2009/0002364 A1 | 1/2009 | Witte, II | |
| 2009/0138290 A1* | 5/2009 | Holden | 705/4 |
| 2011/0045852 A1 | 2/2011 | Kovach | |
| 2012/0076437 A1* | 3/2012 | King | 382/286 |
| 2013/0317864 A1* | 11/2013 | Tofte et al. | 705/4 |

FOREIGN PATENT DOCUMENTS

| | | |
|---|---|---|
| JP | 2001-76055 A | 3/2001 |
| KR | 10-2001-0069855 A | 7/2001 |
| KR | 10-2006-0031208 A | 4/2006 |

* cited by examiner

*Primary Examiner* — Yonel Beaulieu
*Assistant Examiner* — Basil T Jos
(74) *Attorney, Agent, or Firm* — Christensen O'Connor Johnson Kindness PLLC

(57) ABSTRACT

A system quantifies the extent of a damaged vehicle in the absence of a specialist (appraiser) present onsite. The system enables an objective estimate of the damage, supplanting or merely supplementing psychologically biased claimant reporting. The system has hardware structures to perform imagery quantification of damage on a damaged vehicle. The damaged vehicle may be located anywhere, including at the scene of an accident, at an insured's home, at an insurer's claims offices, or at a body shop. Anyone, including the insured, with a mobile device such as a smart phone, may download onto it a mobile application that guides the user to take photographs or moving images of the damaged vehicle for the system to perform imagery quantification of damage.

19 Claims, 8 Drawing Sheets

IMAGERY QUANTIFICATION OF DAMAGE

CROSS-REFERENCE TO RELATED APPLICATION

This application claims the benefit of Provisional Application No. 61/780,581, filed Mar. 13, 2013, which is incorporated herein by reference.

TECHNICAL FIELD

The present subject matter is generally related to computer vision, and more particularly, it relates to using computer vision for imagery quantification of damage.

BACKGROUND

Computer vision includes methods for acquiring, processing, analyzing, and understanding images, and in particular, high-dimensional data from the real world in order to produce numerical or symbolic information, such as in the form of decisions. A recent development in this field has been to duplicate the abilities of human vision by electronically perceiving and understanding an image. Computer vision seeks to apply theories and models to the construction of computer vision systems. Examples of applications of computer vision include a system for automatic inspection, such as in manufacturing applications. However, there has been no application in the insurance industry.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aspect of the present subject matter includes a system form which recites a system comprising a mobile device on which a mobile application executes. The system further comprises a photograph-guiding computer, the hardware structure of which is capable of communicating with the mobile application executing on the mobile device to present a grid diagram so as to guide a user to take photographs of a damaged vehicle. The photograph-guiding computer guides the user of the mobile application being executed on the mobile device to take photographs of the damaged vehicle at a first position and at a second position.

Another aspect of the present subject matter includes a method form that recites a method comprising executing a mobile application on a mobile device. The method also recites turning on a camera on the mobile device. The method additionally recites displaying a grid diagram on the mobile device. The method further recites guiding a user to photograph a damaged vehicle using the grid diagram to produce photographs at a first angle and a second angle. The method yet further quantifies the photographs taken by the user of the damaged vehicle to calculate a depth of damage to the damaged vehicle. The method finally recites repeating the act of guiding if a relative movement of deepest points observed between two or more photographs taken from adjacent but distinct angles will not enable depth calculations.

A further aspect of the present subject matter includes a computer-readable form that recites a non-transitory computer-readable medium having computer-executable instructions stored thereon for implementing a method, comprising executing a mobile application on a mobile device. The method also recites turning on a camera on the mobile device. The method additionally recites displaying a grid diagram on the mobile device. The method further recites guiding a user to photograph a damaged vehicle using the grid diagram to produce photographs at a first angle and a second angle. The method yet further quantifies the photographs taken by the user of the damaged vehicle to calculate a depth of damage to the damaged vehicle. The method finally recites repeating the act of guiding if a relative movement of deepest points observed between two or more photographs taken from adjacent but distinct angles will not enable depth calculations.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
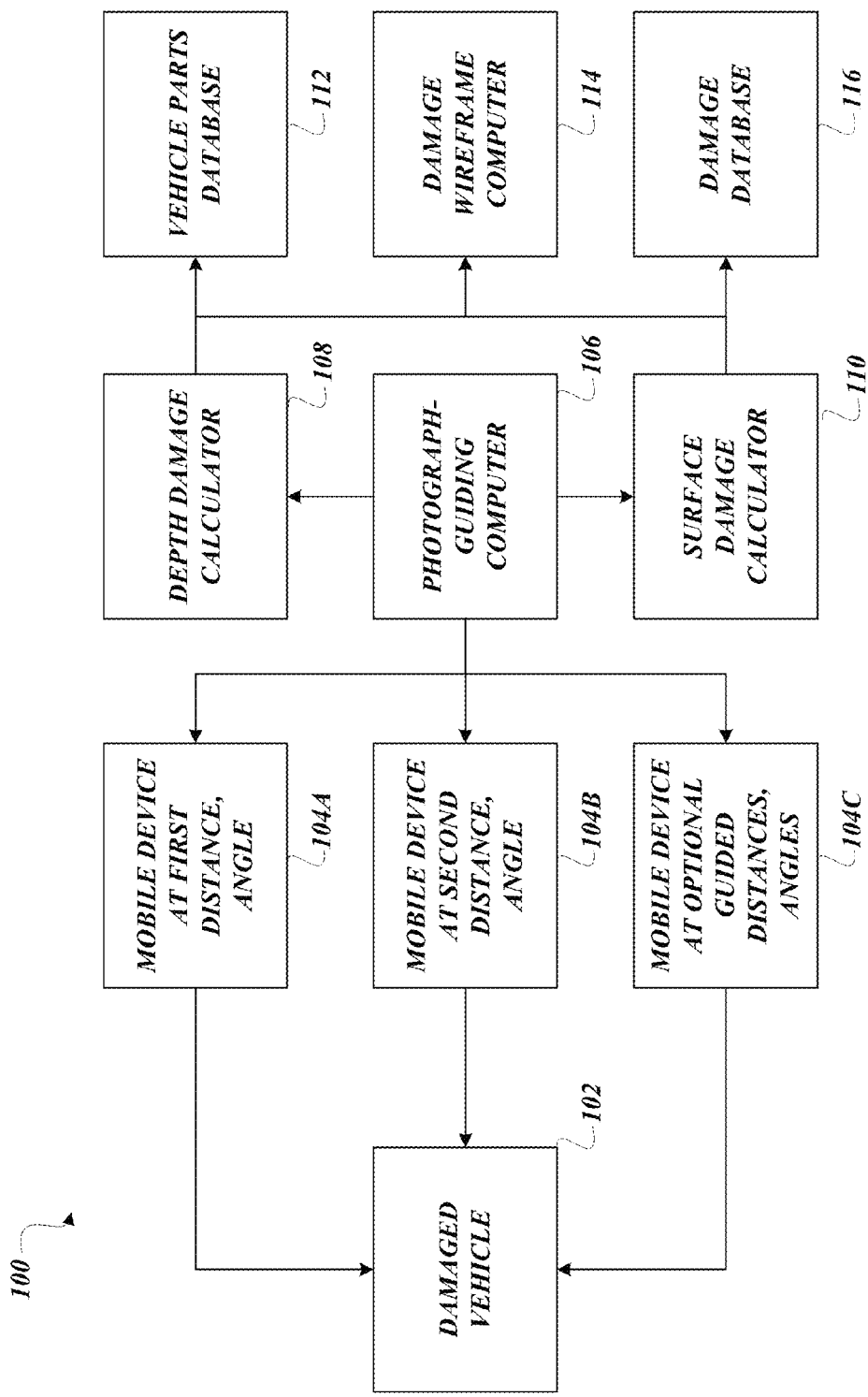
FIG. 1 is a block diagram illustrating an archetypical system, the hardware structures of which are suitable for imagery quantification of damage.
Figure 2A:
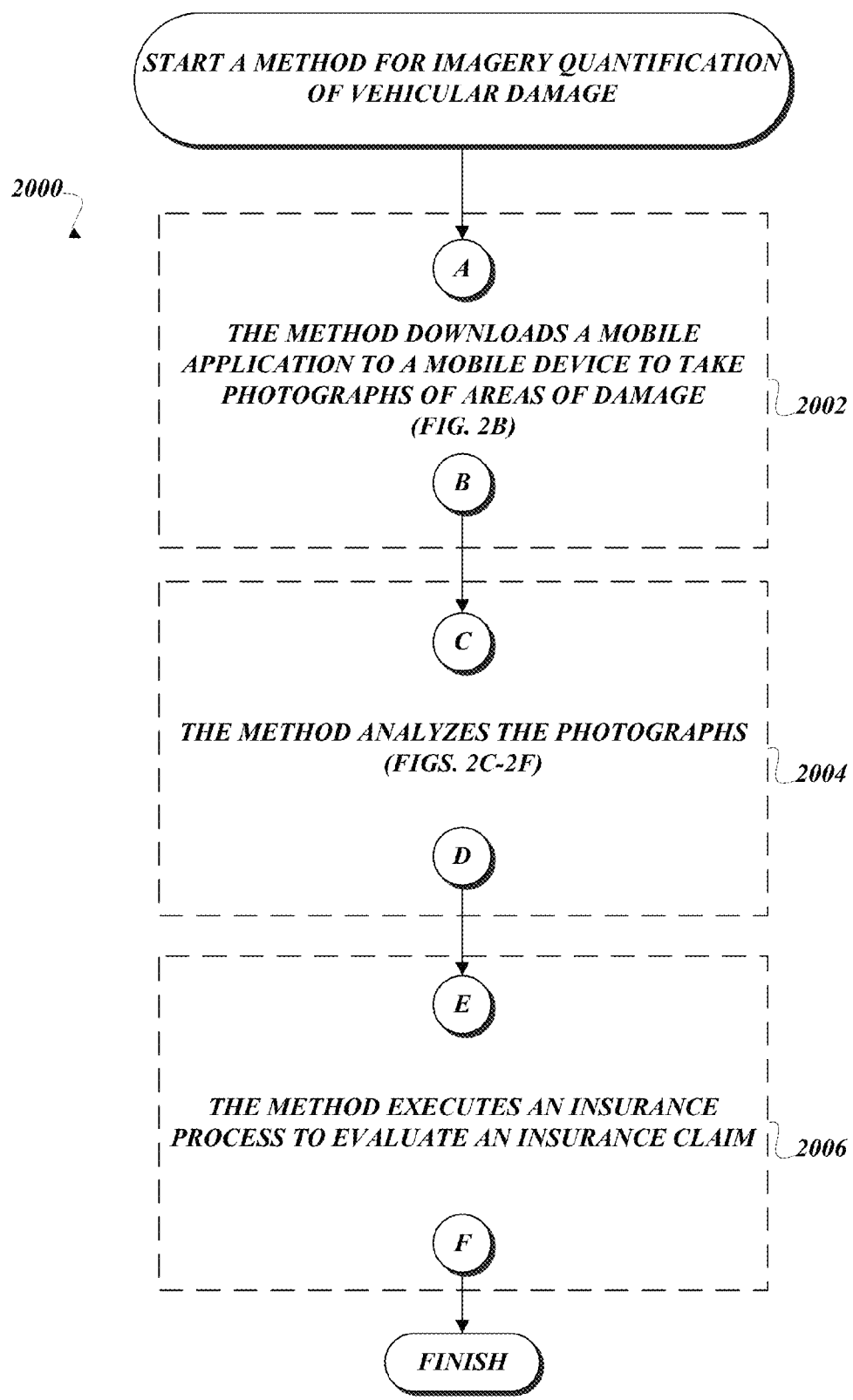
FIGS. 2A-2F are process diagrams illustrating an archetypical method for imagery quantification of vehicular damage in an insurance process.
Figure 2B:
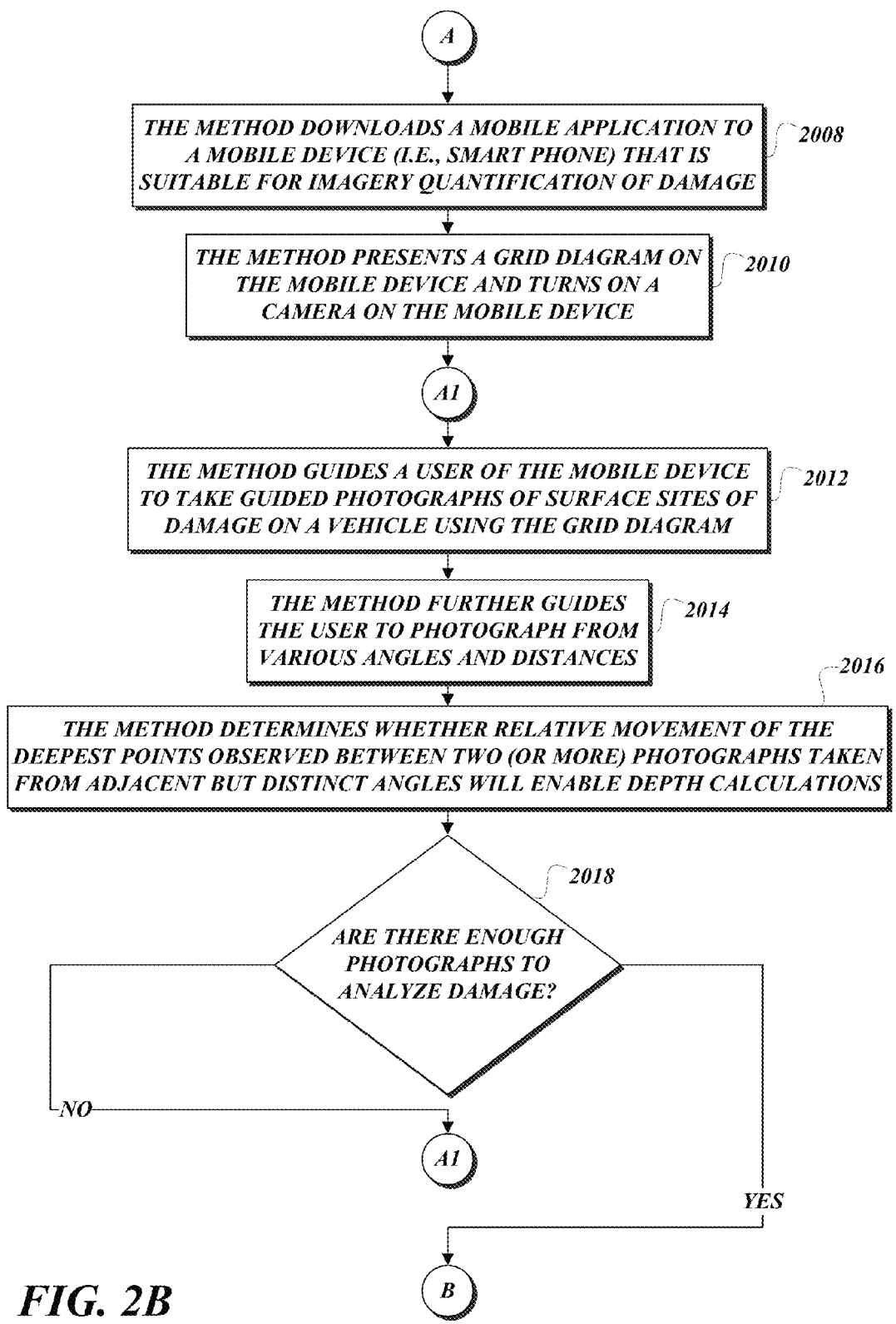
Figure 2C:
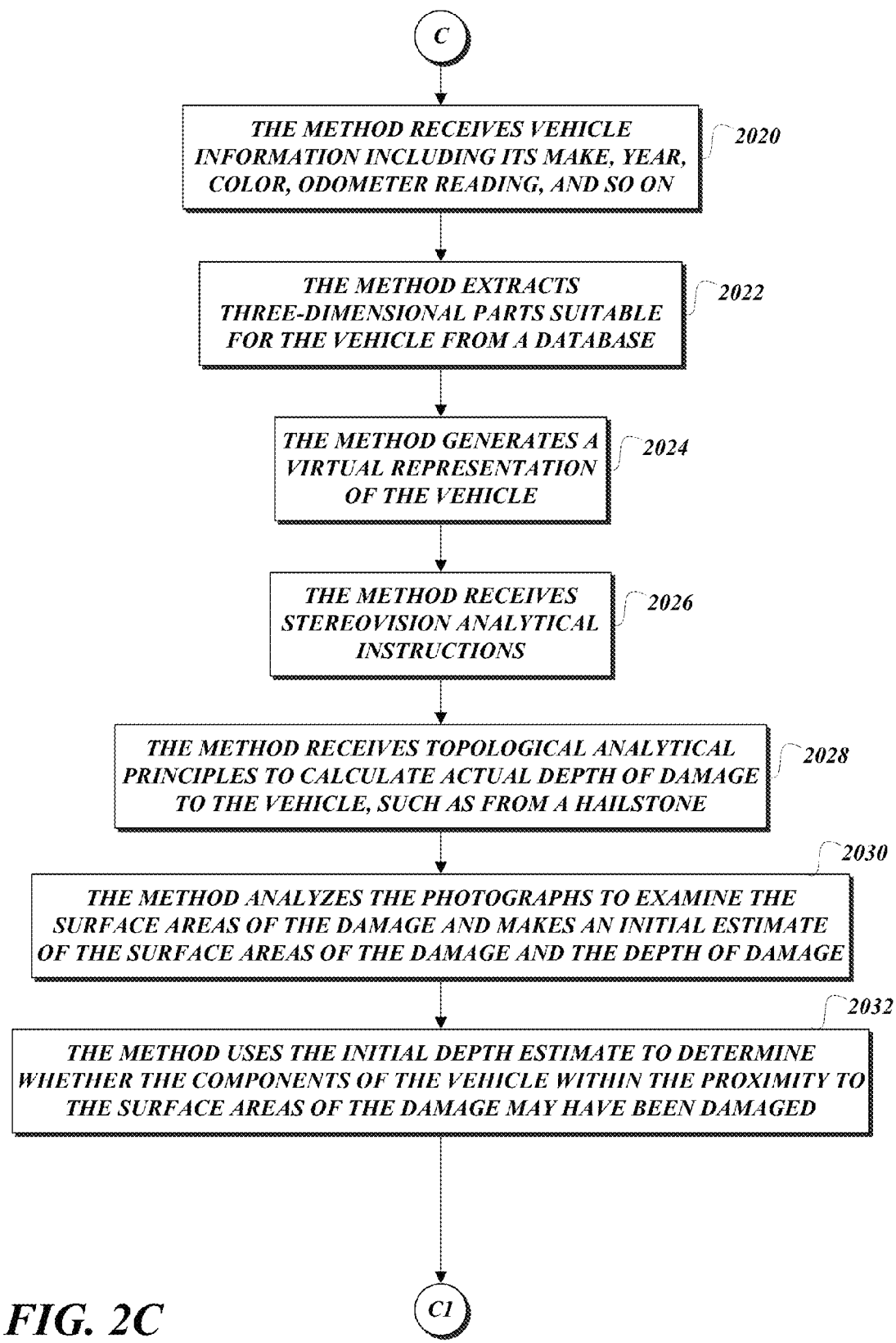
Figure 2D:
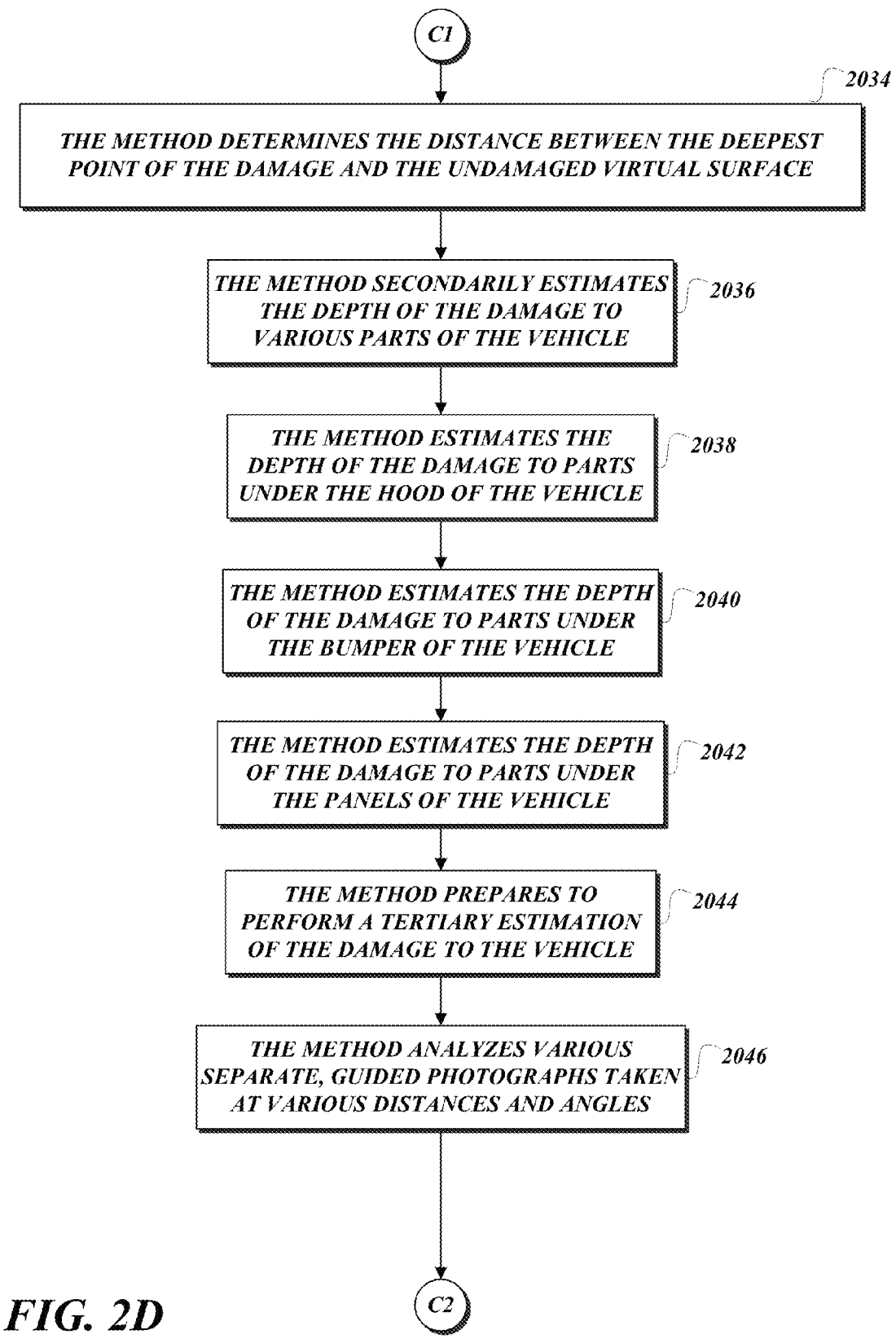
Figure 2E:
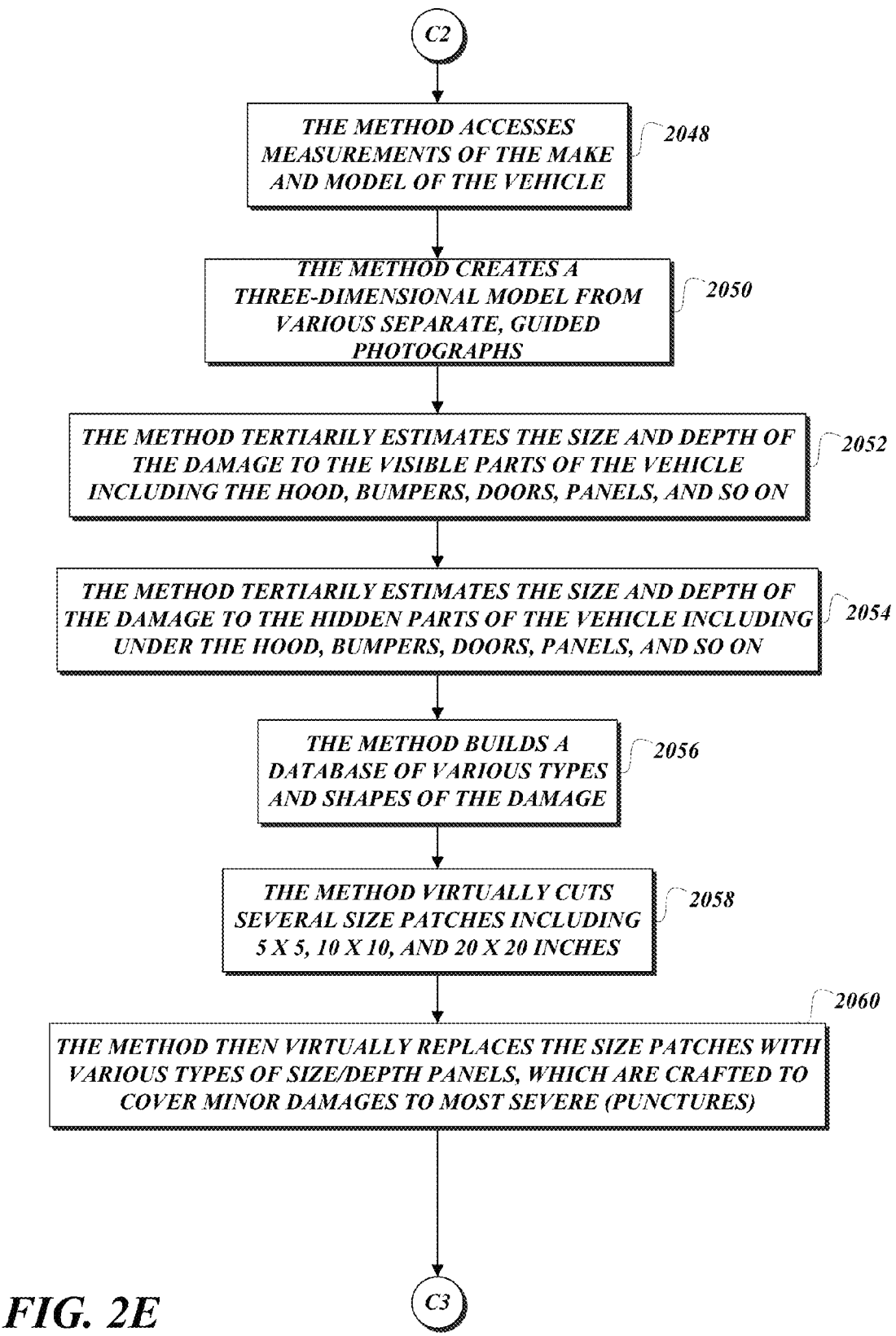
Figure 2F:
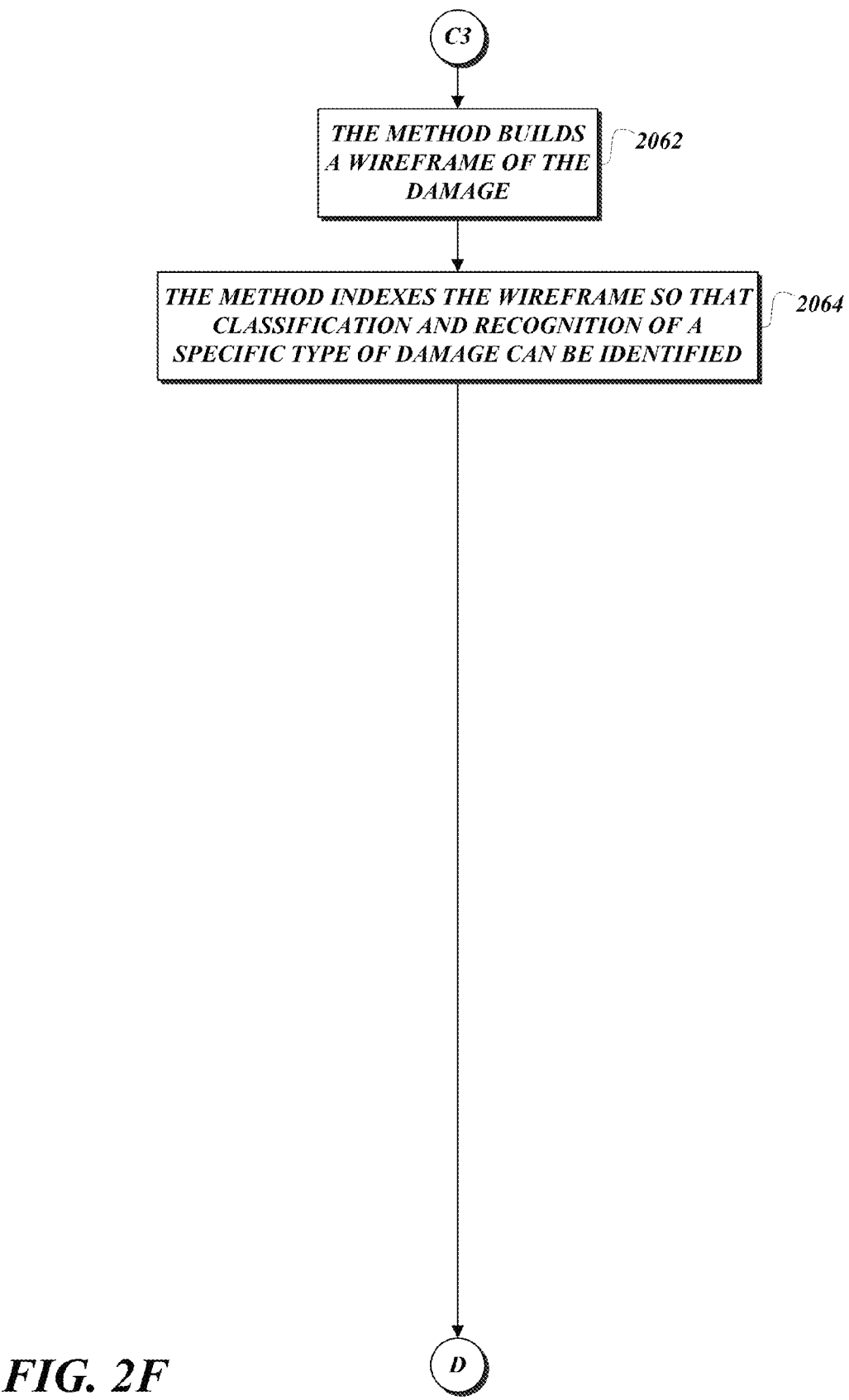

Various embodiments of the present subject matter quantify the extent of a damaged vehicle in the absence of a specialist (appraiser) present onsite. Various embodiments enable an objective estimate of the damage, supplanting or merely supplementing psychologically biased claimant reporting. FIG. 1 illustrates a system 100, the hardware structures of which are suitable to perform imagery quantification of damage on a damaged vehicle 102. The damaged vehicle 102 may be located anywhere, including at the scene of accident, at an insured's home, at an insurer's claims offices, or at a body shop. Anyone, including the insured, with a mobile device such as a smart phone, may download onto it a mobile application that guides a user to take photographs or moving images of the damaged vehicle 102 for the system 100 to perform imagery quantification of damage.

The system 100 includes a photograph-guiding computer 106, the hardware structure of which is capable of communicating with the mobile application executing on the mobile device so as to guide the insured to take photographs of the damaged vehicle 102. The photograph-guiding computer 106 guides the user of the mobile application being executed on the mobile device to take photographs of the damaged vehicle 102 in various settings. For example, the mobile device may take photographs as a first distance, angle 104A. A suitable first distance includes ten feet, three feet, or twelve inches, but many other first distances are possible. A suitable first angle includes 0 degrees, 45 degrees, 90 degrees, 135 degrees, 180 degrees, or any angle in between. The same mobile device may take further photographs at a second distance, angle 104B. A suitable second distance includes twelve inches, six inches, or one inch, but many other second distances are possible. A suitable second angle includes 0 degrees, 45 degrees, 90 degrees, 135 degrees, 180 degrees, or any angle in between. The photograph-guiding computer 106 may instruct the user to use the mobile application being executed on the mobile device to take additional photographs at optional guided distances, angles 104C.

The photograph-guiding computer 106 compares the photographs while shifting the photographs together subjacent, adjacent, superjacent, or in combination so as to find the portions that match. The calculated shifted quantity is a disparity. The photograph-guiding computer 106 may transmit the disparity to the system 100 for further calculations or it may use the disparity at which the damaged surfaces of the damaged vehicle 102 result in a best match to allow calculation of distances. The photograph-guiding computer 106 may calculate epipolar geometry calculations, although other hardware structures of the system 100 may instead make such calculations. The epipolar geometry calculations are made to rectify the problems of the user of the mobile application executing on the mobile device not being on the same image plane at the first distance, angle 104A; at the second distance, angle 104B; and/or at distances, angles 104C. These calculations enable the photographs to be reprojected through a linear transformation so they are on the same image plane to enable imagery quantification of damage on the damaged vehicle 102.

When the photographs are received by the system 100 and/or processed by the photograph-guiding computer 106, a depth damage calculator 108 is used, the hardware structure of which has the capacity to calculate the depth of the damage of the damaged vehicle 102. The photographs are also communicated to a surface damage calculator 110, the hardware structure of which is suitable for calculating the surface that has been damaged or the size of the damage on the surfaces of the damaged vehicle 102. The calculations made by the photograph-guiding computer 106, the depth damage calculator 108, and the surface damage calculator 110 are communicated to a vehicle parts database 112, a damage wireframe computer 114, and a damage database 116.

The vehicle parts database 112 is suitable to provide information or is part of a car appraisal system to identify parts availability, location of parts or body shops, costs, and so on. The vehicle parts database 112 provides virtual undamaged parts of the damaged vehicle 102 if the make, model, year, and other pieces of vehicular information are provided. In one embodiment, the vehicle parts database 112 provides three-dimensional virtual parts so as to facilitate the operation of the damage wireframe computer 114, the hardware structure of which is capable of generating a virtual representation of the damaged vehicle 102. In another embodiment, the hardware structure of the damage wireframe computer 114 has the capacity to generate a wireframe of the damaged vehicle 102. The hardware structure of the damage database 116 is suitable for creating and storing different types and shapes of damage, including several different size patches (e.g., 5×5, 10×10, 20×20 inches) which are virtually cut from the surfaces of the damaged vehicle 102. The damage database 116 may propose various types of damaged (size/depth) panels which are crafted to cover a wide range of potential damage, from minor to the most severe (such as punctures).

Figure 3:
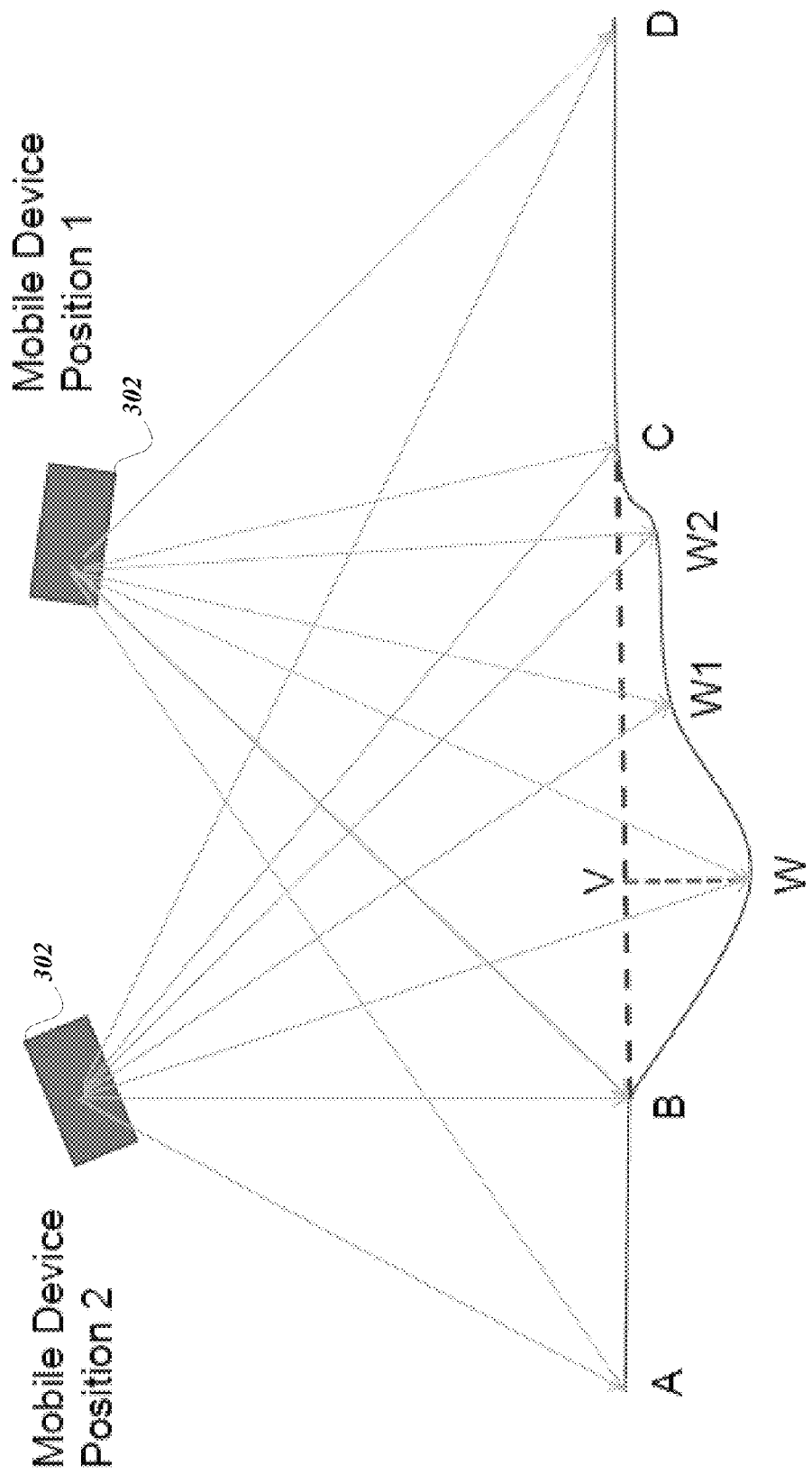
FIG. 3 is a pictorial diagram illustrating exemplary positions of a mobile device to image vehicular damage to measure damage depth.

FIG. 3 illustrates a mobile device 302 being used by the user who is guided by a mobile application executing on the mobile device 302 so as to guide the user to take photographs of a damaged vehicle. The mobile application guides the user to image undamaged surfaces and damaged surfaces at various positions (e.g., distances and angles of position 1 and distances and angles of position 2) to various points including A, B, W, W1, W2, C, and D. Using the imaged photographs, calculations are made to determine the distance between W (actual maximum depth point) and V (a point on a virtual undamaged surface with which W creates a geometric line). As illustrated, the mobile device 302 is guided to two positions, position 1 and position 2. Using the imaged photographs, calculations are made to compare the length of AD. Using this length and the angles from which imaged photographs are taken, calculations are made to check whether point B is on a straight line between A and D. The procedure is repeated for points deemed of interest from the imaged photographs suitably based on lighting changes, shading changes, or other determinations. One example calculation includes assuming that the length of the geometric line connecting points W, V is a side of a triangle and uses triangle geometric calculations to determine the length of the geometric line W, V. The essence is to calculate the longest distance and/or deformation between actual points on the damaged surface W and the virtual point on the undamaged surface V.

FIGS. 2A-2F are process diagrams implementing a method 2000 for imagery quantification of vehicular damage. From a start block, the method 2000 proceeds to a set of method steps 2002 defined between a continuation terminal ("terminal A") and another continuation terminal ("terminal B"). The set of method steps 2002 downloads a mobile application to a mobile device to take photographs of areas of damage. From terminal A (FIG. 2B), the method proceeds to block 2008 where the method downloads a mobile application to a mobile device (e.g., a smartphone) that is suitable for imagery quantification of damage. At block 2010, the method presents a grid diagram on the mobile device and turns on a camera on the mobile device. The method then continues to another continuation terminal ("terminal A1"). From terminal A1 (FIG. 2B), the method 2000 proceeds to block 2012 where the method guides a user of the mobile device to take guided photographs of surface sites of damage on a vehicle using the grid diagram. At block 2014, the method further guides the user to take photographs from various angles and distances. At block 2016, the method determines whether relative movement of the deepest points observed between two (or more) photographs taken from adjacent but distinct angles will enable depth calculations. Proceeding on to decision block 2018, a test is performed to determine whether there are enough photographs to analyze damage (not enabling depth calculations). If the answer to the test at decision block 2018 is NO, the method proceeds to terminal A1 and skips back to block 2012 where the above-identified processing steps are repeated. Otherwise, if the answer to the test at decision block 2018 is YES, the method proceeds to terminal B.

From terminal B (FIG. 2A), the method proceeds to a set of method steps 2004 defined between a continuation terminal ("terminal C") and another continuation terminal ("terminal D"). The set of method steps 2004 analyzes the photographs taken by the mobile device. From terminal C (FIG. 2C), the method receives vehicle information including its make, model, year, color, odometer reading, and so on. See block 2020. At block 2022, the method extracts three-dimensional parts suitable for the vehicle from a database. At block 2024, the method generates a virtual representation of the undamaged vehicle. At block 2026, the method receives stereovision analytical instructions. At block 2028, the method receives topological analytical principles to calculate actual depth of damage to the vehicle, such as from a hailstone or from a collision (e.g., bumper, hood, grill deformation). At block 2030, the method analyzes the photographs to examine the surface area of the damage and makes an initial estimate of the surface areas of the damage and the depth of damage. At block 2032, the method uses the initial depth estimate to determine whether the components of the vehicle within the proximity to the surface areas of the damage may have been damaged. The method then continues to another continuation terminal ("terminal C1").

From terminal C1 (FIG. 2D), the method proceeds to block 2034 where the method determines the distance between the deepest point of the damage and the undamaged virtual surface corresponding to it. At block 2036, the method secondarily estimates the depth of the damage to various parts of the vehicle. At block 2038, the method estimates the depth of the damage to parts under the hood of the vehicle. At block 2040, the method estimates the depth of the damage to parts under the bumper of the vehicle. At block 2042, the method estimates the depth of the damage to parts under the panels of the vehicle. At block 2044, the method prepares to perform a tertiary estimation of the damage to the vehicle. At block 2046, the method analyzes various separate, guided photographs taken at various distances and angles. The method then continues to another continuation terminal ("terminal C2").

From terminal C2 (FIG. 2E), the method at block 2048 extracts measurements of the make and model of the vehicle. At block 2050, the method creates a three-dimensional model of the damage from various separate, guided photographs. At block 2052, the method tertiarily estimates the size and depth of the damage to the visible parts of the vehicle including the hood, bumpers, doors, panels, and so on. At block 2054, the method tertiarily estimates the size and depth of the damage to the hidden parts of the vehicle including under the hood, bumpers, doors, panels, and so on. At block 2056, the method builds a database of various types and shapes of the damage. At block 2058, the method virtually cuts several different size patches including 5×5, 10×10, and 20×20 inches. At block 2060, the method then virtually replaces the different size patches with the various types of size/depth panels, which are crafted to cover minor damage to the most severe (such as punctures) damages. The method then continues to another continuation terminal ("terminal C3").

From terminal C3 (FIG. 2F), the method proceeds to block 2062 where the method builds a wireframe of the damage. At block 2064, the method indexes the wireframe so that classification and recognition of a specific type of damage can be identified. The method then continues to terminal D. From terminal D (FIG. 2A), the method proceeds to a set of method steps 2006 defined between a continuation terminal ("terminal E") and another continuation terminal ("terminal F"). The set of method steps 2006 executes an insurance process to evaluate an insurance claim. All embodiments are engineered to expedite the processing of the claim through an earlier, electronically precise estimate of the damage enabling an efficient channeling of the claim, such as in a total loss scenario. A few embodiments allow complete automation of vehicle damage handling. The method then terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   a mobile device on which a mobile application executes; and
   a photograph-guiding computer, the hardware structure of which is capable of electronically communicating with the mobile application executing on the mobile device to electronically present a grid diagram so as to electronically guide a user to take photographs of a damaged vehicle, the photograph-guiding computer electronically guiding the user of the mobile application being executed on the mobile device to take photographs of the damaged vehicle at a first position including a first distance and at a second position including a second distance.

2. The system of claim 1, wherein the photograph-guiding computer guides the user of the mobile application being executed on the mobile device to take photographs of the damaged vehicle at the first position including the first distance and a first angle and the second position including the second distance and a second angle.

3. The system of claim 2, further comprising a surface damage calculator, the hardware structure of which has the capacity to calculate the surface that has been damaged or the size of the damage on the surfaces of the damaged vehicle.

4. The system of claim 1, further comprising a depth damage calculator, the hardware structure of which is capable of calculating the depth of the damage of the damaged vehicle.

5. The system of claim 4, further comprising a vehicle parts database which provides three-dimensional virtual undamaged parts of the damaged vehicle if the make, model, and year are provided.

6. The system of claim 5, further comprising a damage wireframe computer, the hardware structure of which is suitable for generating a virtual representation of the damaged vehicle.

7. The system of claim 6, further comprising a damage database which is suitable for creating and storing several different size patches selected from a group consisting essentially of 5×5, 10×10, and 20×20 inches, which are virtually cut from the surfaces of the damaged vehicle.

8. A method comprising:
   electronically executing a mobile application on a mobile device;
   electronically turning on a camera on the mobile device;
   electronically displaying a grid diagram on the mobile device;
   electronically guiding a user to photograph a damaged vehicle using the grid diagram to produce photographs at a first distance, a first angle, a second distance, and a second angle;
   electronically quantifying the photographs taken by the user of the damaged vehicle using the first distance and the second distance to calculate a depth of damage to the damaged vehicle; and
   electronically repeating the act of guiding the user if a relative movement of deepest points observed between two or more photographs taken from adjacent but distinct angles will not enable depth calculations.

9. The method of claim 8, wherein quantifying includes calculating a surface of damage to the damaged vehicle.

10. The method of claim 9, further comprising receiving make, model, and year of the damaged vehicle, and extracting three-dimensional parts suitable for the damaged vehicle from a database so as to generate a virtual representation of the damaged vehicle.

11. The method of claim 10, further comprising receiving stereovision analytical instructions so as to analyze the photographs.

12. The method of claim 11, further comprising receiving topological analytical instructions so as to analyze the photographs and quantify an initial depth of damage to the damaged vehicle.

13. The method of claim 12, further comprising using the initial depth estimate to determine whether components of the damaged vehicle within proximity to the surface areas of the damage may have been damaged.

14. The method of claim 13, further comprising determining the distance between a deepest point of the damage and a point on an undamaged virtual surface, both points of which creating a geometric line.

15. The method of claim 14, further comprising estimating a secondary depth of the damage to various parts of the damaged vehicle selected from a group consisting essentially of parts under a hood, parts under a bumper, parts under a door, and parts under panels of the damaged vehicle.

16. The method of claim 15, further comprising building a database of various types and shapes of the damage, and virtually cutting several different size patches selected from a group consisting essentially of 5×5, 10×10, and 20×20 inches.

17. The method of claim 16, further comprising virtually replacing the different size patches with various types of size/depth panels, which are crafted to cover minor damage to the most severe damage.

18. The method of claim 17, further comprising building a wireframe of the damage and indexing the wireframe so that classification and recognition of a specific type of damage can be identified.

19. A non-transitory computer-readable medium having computer-executable instructions stored thereon for implementing a method, comprising:
    electronically executing a mobile application on a mobile device;
    electronically turning on a camera on the mobile device;
    electronically displaying a grid diagram on the mobile device;
    electronically guiding a user to photograph a damaged vehicle using the grid diagram to produce photographs at a first angle and a second angle;
    electronically quantifying the photographs taken by the user of the damaged vehicle to calculate a depth of damage to the damaged vehicle; and
    electronically repeating the act of guiding the user by the photograph-guiding computer if a relative movement of deepest points observed between two or more photographs taken from adjacent but distinct angles will not enable depth calculations.

\* \* \* \* \*